US011210774B2

(12) United States Patent
Schroers et al.

(10) Patent No.: US 11,210,774 B2
(45) Date of Patent: Dec. 28, 2021

(54) AUTOMATED PIXEL ERROR DETECTION USING AN INPAINTING NEURAL NETWORK

(71) Applicants: Disney Enterprises, Inc., Burbank, CA (US); ETH Zurich, Zurich (CH)

(72) Inventors: Christopher Richard Schroers, Zürich (CH); Abdelaziz Djelouah, Zürich (CH); Sutao Wang, Zurich (CH); Erika Varis Doggett, Burbank, CA (US)

(73) Assignees: Disney Enterprises, Inc., Burbank, CA (US); ETH Zürich (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 0 days.

(21) Appl. No.: 16/836,453

(22) Filed: Mar. 31, 2020

(65) Prior Publication Data
US 2021/0304387 A1 Sep. 30, 2021

(51) Int. Cl.
*G06T 7/00* (2017.01)
*G06T 5/50* (2006.01)
*G06N 3/04* (2006.01)
*G06T 9/00* (2006.01)
(Continued)

(52) U.S. Cl.
CPC ............ *G06T 7/0002* (2013.01); *G06N 3/04* (2013.01); *G06T 5/005* (2013.01); *G06T 5/50* (2013.01); *G06T 9/002* (2013.01); *G06N 3/08* (2013.01); *G06T 2207/10016* (2013.01); *G06T 2207/20084* (2013.01)

(58) Field of Classification Search
None
See application file for complete search history.

(56) References Cited

U.S. PATENT DOCUMENTS

| 10,733,722 | B2 * | 8/2020 | Niculescu-Mizil ........................ G06K 9/6284 |
| 2010/0239187 | A1 * | 9/2010 | Yea .......................... G06T 5/005 382/298 |
| 2019/0295227 | A1 * | 9/2019 | Wang .................... G06K 9/4628 |

(Continued)

OTHER PUBLICATIONS

"Batch Normalization: Accelerating Deep Network Training by Reducing Internal Covariate Shift" by Sergey Ioffe and Christian Szegedy. (Mar. 2015).

(Continued)

*Primary Examiner* — James A Thompson
(74) *Attorney, Agent, or Firm* — Farjami & Farjami LLP (57) ABSTRACT

According to one implementation, a pixel error detection system includes a hardware processor and a system memory storing a software code. The hardware processor is configured to execute the software code to receive an input image, to mask, using an inpainting neural network (NN), one or more patch(es) of the input image, and to inpaint, using the inpainting NN, the masked patch(es) based an input image pixels neighboring each of the masked patch(es). The hardware processor is configured to further execute the software code to generate, using the inpainting NN, a residual image based on differences between the inpainted masked patch(es) and the patch(es) in the input image and to identify one or more anomalous pixel(s) in the input image using the residual image.

20 Claims, 6 Drawing Sheets

(51) Int. Cl.
  *G06N 3/08*   (2006.01)
  *G06T 5/00*   (2006.01)

(56) References Cited

U.S. PATENT DOCUMENTS

| | | |
|---|---|---|
| 2019/0295228 A1* | 9/2019 | Liu .................... G06T 5/005 |
| 2020/0126190 A1* | 4/2020 | Lebel .................. G06K 9/66 |
| 2020/0279358 A1* | 9/2020 | Li ...................... G06T 7/001 |
| 2020/0364842 A1* | 11/2020 | Chaton ............... G06N 3/08 |
| 2020/0402215 A1* | 12/2020 | Yang .................. G06T 11/00 |
| 2021/0232859 A1* | 7/2021 | Kumar ............. G06Q 30/0283 |
| 2021/0264591 A1* | 8/2021 | Park ................... G06T 7/0012 |

OTHER PUBLICATIONS

"U-Net: Convolutional Networks for Biomedical Image Segmentation" by Olaf Ronneberger, Philipp Fischer, and Thomas Brox. (May 2015).
"Context Encoders: Feature Learning by Inpainting" by Deepak Pathak, Philipp Krahenbuhl, Jeff Donahue, Trevor Darrell, Alexei A. Efros. (Nov. 2016).
"PIRM Challenge on Perceptual Image Enhancement on Smartphones: Report" by Ignatov et al. (2018).
"Image Inpainting for Irregular Holes Using Partial Convolutions" by Guilin Liu. Fitsum A. Reda, Kevin J. Shih, Ting-Chun Wang, Andrew Tao, and Bryan Catanzaro. (ECCV 2018).

* cited by examiner

AUTOMATED PIXEL ERROR DETECTION USING AN INPAINTING NEURAL NETWORK

BACKGROUND

Pixel errors in images occur with regularity but can be difficult and costly to identify. For example, anomalous pixels in video frames can be introduced by many different processes within a video production pipeline. A final quality procedure for detecting and correcting such errors is typically done before the video undergoes final release.

In the conventional art, anomalous pixel detection is usually performed by human inspectors. Generally, those human inspectors are tasked with checking every single frame of each video several hundreds of times before its final distribution. Due to this intense reliance on human participation, the conventional approach to pixel error detection and correction is undesirably expensive and time consuming. Accordingly, there is a need in the art for an image correction solution enabling accurate detection of anomalous pixel errors using an automated process.

SUMMARY

There are provided systems and methods for performing automated pixel error detection using an inpainting neural network, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated pixel error detection using an inpainting neural network that overcome the drawbacks and deficiencies in the conventional art. It is noted that the methods disclosed by the present application may be performed as substantially automated processes by substantially automated systems. It is further noted that, as used in the present application, the terms "automation," "automated", and "automating" refer to systems and processes that do not require the participation of a human user performing image inspection. Although, in some implementations, a human inspector may review the performance of the automated systems described herein, that human involvement is optional. Thus, the methods described in the present application may be performed under the control of hardware processing components of the disclosed automated systems.

Moreover, as defined in the present application, an artificial neural network, also known simply as a neural network (hereinafter "NN"), is a type of machine learning framework in which patterns or learned representations of observed data are processed using highly connected computational layers that map the relationship between inputs and outputs. A "deep neural network," in the context of deep learning, may refer to a neural network that utilizes multiple hidden layers between input and output layers, which may allow for learning based on features not explicitly defined in raw data. As used in the present application, a feature labeled as an NN refers to a deep neural network. Various forms of NNs, such as the inpainting NN including multiple partial convolutional layers disclosed in the present application, may be used to make predictions about new data based on past examples or "training data." In various implementations, NNs may be utilized to perform image processing or natural-language processing.

Figure 1:
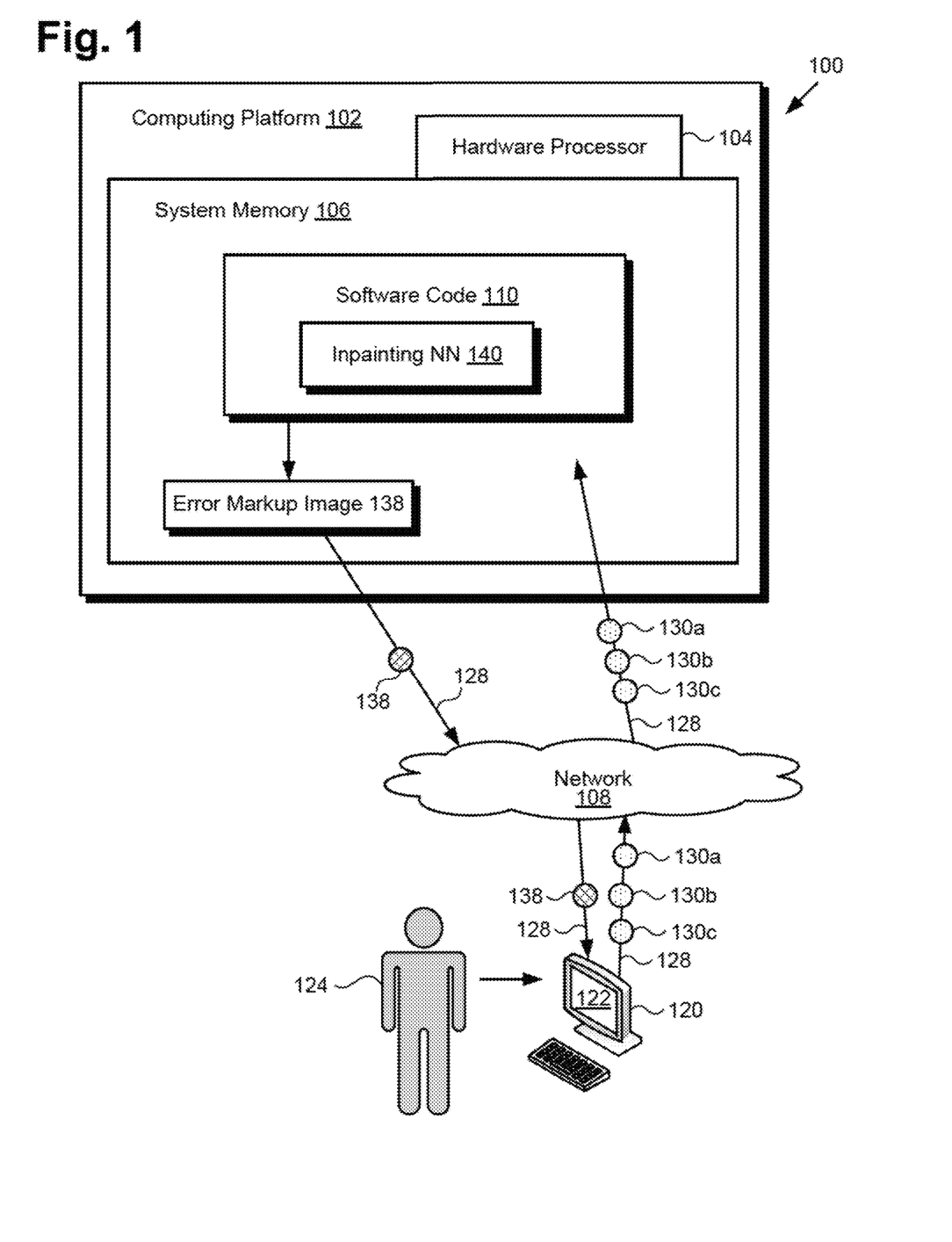
FIG. 1 shows a diagram of an exemplary system for performing automated pixel error detection using an inpainting neural network, according to one implementation.

FIG. 1 shows a diagram of an exemplary system for performing automated pixel error detection using an inpainting neural network, according to one implementation. As discussed below, automated pixel error detection system 100 may be implemented using a computer server accessible over a local area network (LAN) or may be implemented as cloud-based system. As shown in FIG. 1, automated pixel error detection system 100 includes computing platform 102 having hardware processor 104, and system memory 106 implemented as a non-transitory storage device storing software code 110. According to the present exemplary implementation, software code 110 includes inpainting NN 140.

As further shown in FIG. 1, automated pixel error detection system 100 is implemented within a use environment including communication network 108 and user system 120 including display 122. User system 120 is configured to be utilized by user 124. Also shown in FIG. 1 are network communication links 128 interactively connecting user system 120 and automated pixel error detect on system 100 via communication network 108, input images 130a, 130b, and 130c, and error markup image 138 corresponding to one of input images 130a, 130b, or 130c and produced using software code 110. It is noted that although FIG. 1 depicts three input images 130a, 130b, and 130c, more generally input images 130a, 130b, and 130c may correspond to more, or many more, than three input images. For example, in some implementations, each of input images 130a, 130b, and 130c may correspond to one or more video frames included in a video stream received by automated pixel error detection system 100 as an input.

It is further noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts software code 110 as being stored in its entirety in system memory 106, that representation is also provided merely as an aid to conceptual clarity. More generally, automated pixel error detection system 100 may include one or more computing platforms 102, such as computer servers for example, which may be co-located, or may form an interactively linked but distributed system, such as a cloud-based system, for instance.

As a result, hardware processor 104 and system memory 106 may correspond to distributed processor and memory resources within automated pixel error detection system 100. Thus, it is to be understood that various features of software code 110, such as inpainting NN 140 described in greater detail below by reference to FIG. 2, may be stored and/or executed using the distributed memory and/or processor resources of automated pixel error detection system 100.

According to the implementation shown by FIG. 1, user 124 may utilize user system 120 to interact with automated pixel error detection system 100 over communication network 108. In one such implementation, computing platform 102 may correspond to one or more web servers, accessible over a packet-switched network such as the Internet, for example. Alternatively, computing platform 102 may correspond to one or more computer servers supporting a wide area network (WAN), a LAN, or included in another type of limited distribution or private network.

Although user system 120 is shown as a desktop computer in FIG. 1, that representation is also provided merely as an example. More generally, user system 120 may be any suitable mobile or stationary computing device or system that implements data processing capabilities sufficient to provide a user interface, support connections to communication network 108, and implement the functionality ascribed to user system 120 herein. For example, in other implementations, user system 120 may take the form of a laptop computer, tablet computer, or smartphone, for example. User 124 may utilize user system 120 to interact with automated pixel error detection system 100 to use software code 110, executed by hardware processor 104, to produce error markup image 138 corresponding to one of input images 130*a*, 130*b*, or 130*c*.

It is noted that, in various implementations, error markup image 138, when generated using software code 110, may be stored in system memory 106 and/or may be copied to non-volatile storage. Alternatively, or in addition, as shown in FIG. 1, in some implementations, error markup image 138 may be sent to user system 120 including display 122, for example by being transferred via network communication links 128 of communication network 108.

With respect to display 122 of user system 120, display 122 may be physically integrated with user system 120 or may be communicatively coupled to but physically separate from user system 120. For example, where user system 120 is implemented as a smartphone, laptop computer, or tablet computer, display 122 will typically be integrated with user system 120. By contrast, where user system 120 is implemented as a desktop computer, display 122 may take the form of a monitor separate from user system 120 in the form of a computer tower. Moreover, display 122 may be implemented as a liquid crystal display (LCD), a light-emitting diode (LED) display, an organic light-emitting diode (OLED) display, or any other suitable display screen that performs a physical transformation of signals to light.

By way of overview, a region within an image may be identified as anomalous, i.e., having a defect, according to its context. For example, a human observer would typically identify an image region as anomalous based on its color relative to surrounding regions in the image, such as when the image region color appears to vary too much from its surrounding region. The present automated pixel error detection solution adopts and automates a similar strategy. In one implementation, user 124 may utilize user system 120 to transmit one or more input images 130*a* and/or 130*b* and/or 130*c* to automated pixel error detection system 100 for assessment. Software code 110, executed by hardware processor 104, uses inpainting NN 140 to generate a residual image for comparison with each input image. Hardware processor 104 then executes software code 110 to compare the residual image or images with their corresponding input image or images, and to identify one or more anomalous pixels in one or more of the input image(s) based on the comparison.

Figure 2:
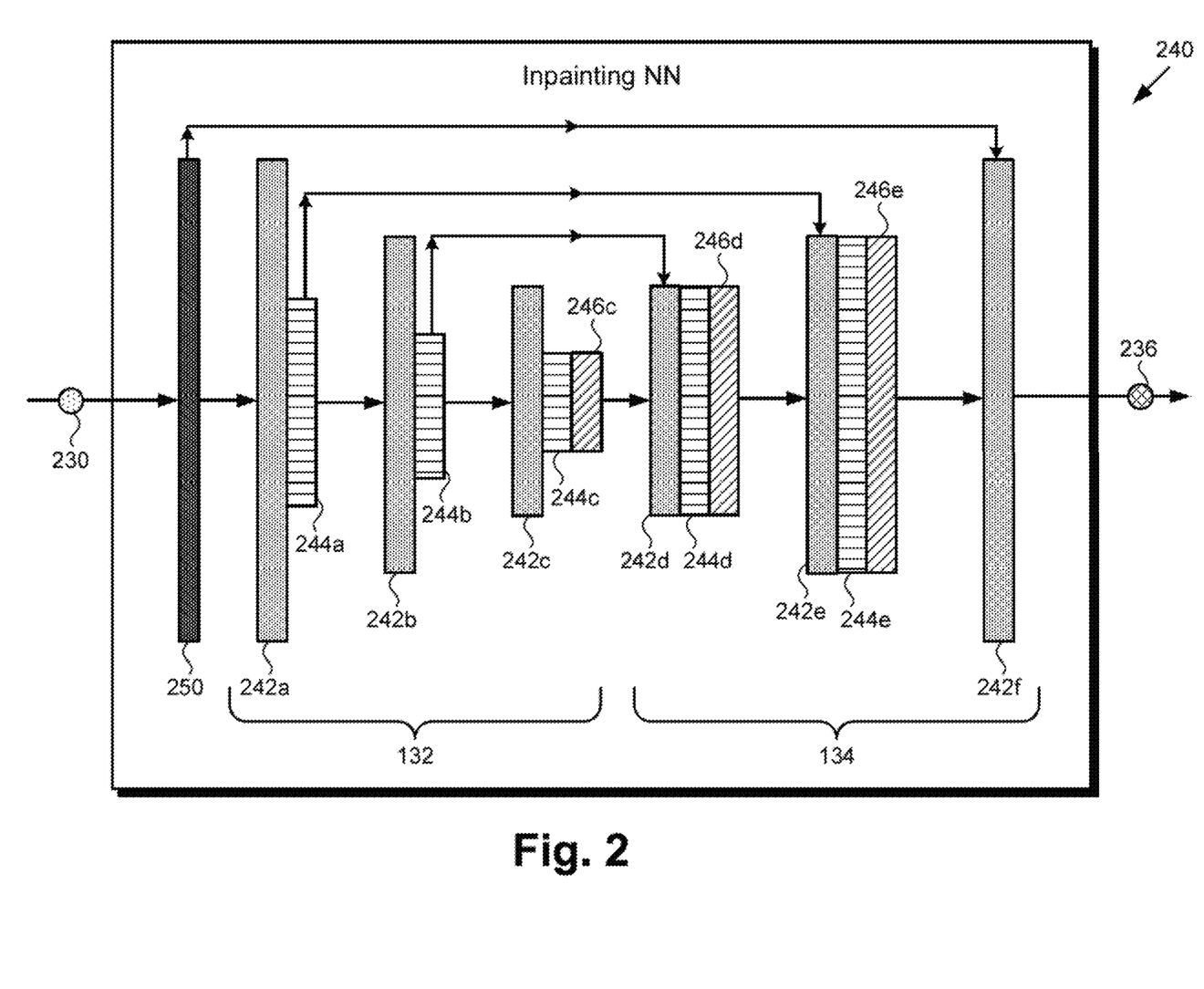
FIG. 2 shows a diagram of an exemplary inpainting neural network suitable for use in a software code of the pixel error detection system in FIG. 1, according to one implementation.

Referring now to FIG. 2, FIG. 2 shows a diagram of exemplary inpainting NN 240 suitable for use in software code 110 of pixel error detection system 100, in FIG. 1, according to one implementation. As shown in FIG. 2, inpainting NN 240 is configured to receive input image 230 and to generate residual image 236 corresponding to input image 230. As further shown in FIG. 2, inpainting NN 240 includes mask multiplication layer 250, encoder stage 132, and decoder stage 134. Also shown in FIG. 2 are partial convolutional encoder layers 242*a*, 242*b*, and 242*c*, partial convolutional decoder layers 242*d*, 242*e*, and 242*f*, batch normalization and rectified linear unit (ReLU) activation layers 244*a*, 244*b*, 244*c*, 244*d*, and 244*c*, (hereinafter "batch normalization and ReLU activation layers 244*a*-244*e*"), and up-sampling layers 246*c*, 246*d*, and 246*e* (hereinafter "up-sampling layers 246*c*-246*e*").

It is noted that although FIG. 2 depicts three partial convolutional encoder layers, three partial convolutional decoder layers, five batch normalization and ReLU activation layers, and three up-sampling layers, that representation is merely exemplary. In other implementations, the respective numbers of partial convolutional encoder layers, partial convolutional decoder layers, batch normalization and ReLU activation layers, and up-sampling layers may vary from those shown in FIG. 2.

Input image 230 corresponds in general to any one of input images 130*a*, 130*b*, or 130*c*, in FIG. 1, while inpainting NN 240 corresponds in general to inpainting NN 140 in that previous figure. As a result, inpainting NN 240 and input image 230 may share any of the features attributed to inpainting NN 140 and input images 130a, 130b, and 130c by the present disclosure, and vice versa. That is to say, like inpainting NN 240, inpainting NN 140 may include mask multiplication layer 250, encoder stage 132, decoder stage 134, as well as partial convolutional layers 242a, 242b, 242c, 242d, 242e and 242f (hereinafter "partial convolutional layers 242a-242f"), batch normalization and ReLU activation layers 244a-244e, and up-sampling layers 246c-246e.

Figure 3:
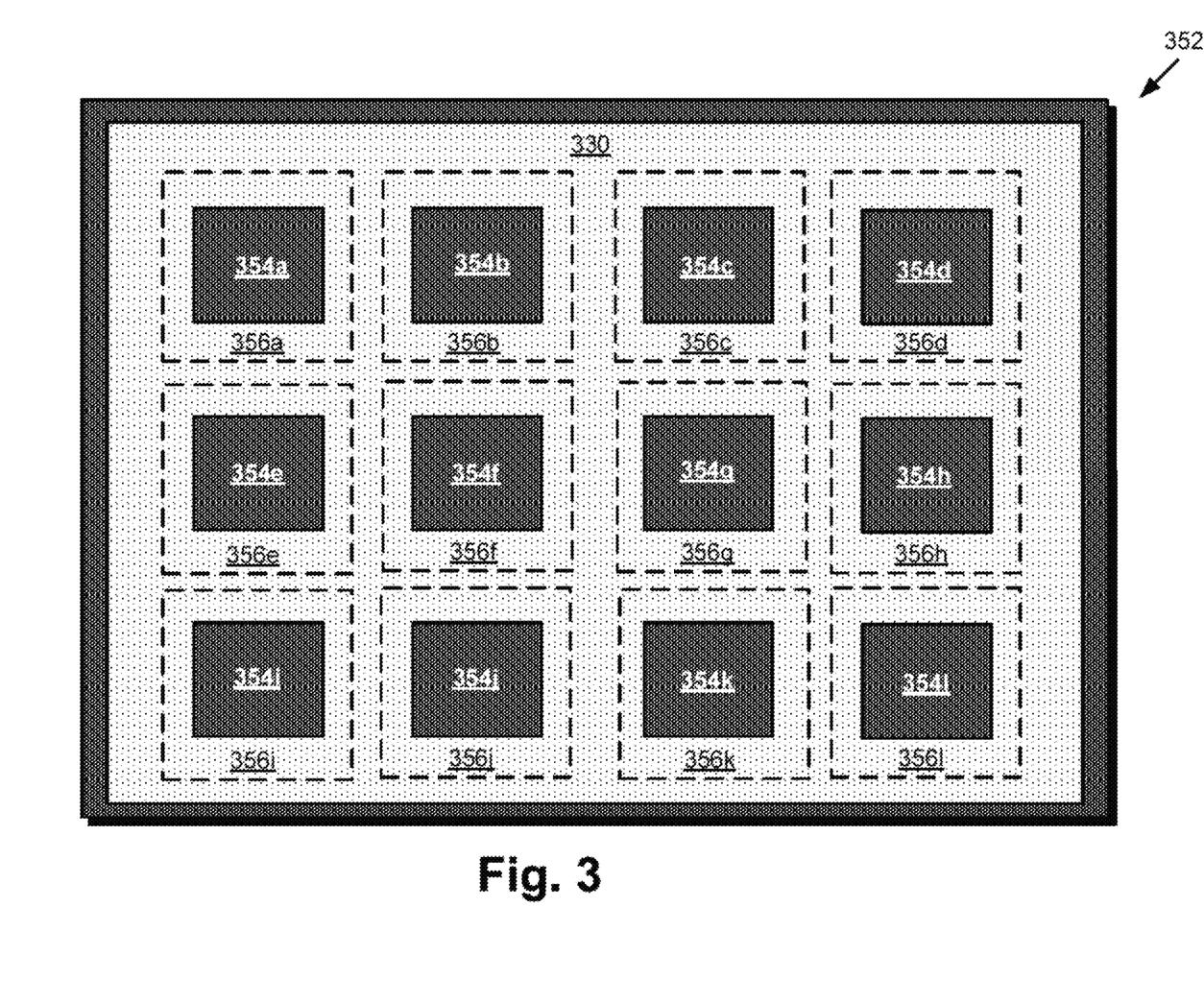
FIG. 3 shows an exemplary mask for masking multiple patches of an input image concurrently, according to one implementation.

FIG. 3 shows exemplary mask 352 for masking patches 354a, 354b, 354c, 354d, 354e, 354f, 354g, 354h, 354i, 354j, 354k, and 354l (hereinafter "patches 354a-354l") of input image 330, according to one implementation. It is noted that each of patches 354a-354l is a region of input image 330 that is blocked or otherwise obscured by mask 352. Also shown in FIG. 3 are respective pixel neighborhoods 356a, 356b, 356c, 356d, 356e, 356f, 356g, 356h, 356i, 356j, 356k, and 356l (hereinafter "pixel neighborhoods 356a-356l") of each of patches 354a-354l. It is further noted that each of pixel neighborhoods 356a-356l includes pixels from original input image 330. Input image 330 corresponds in general to any of input images 130a, 130b, and 130c, in FIG. 1, as well as to input image 230 in FIG. 2. Consequently, input image 330 may share any of the features attributed to input images 130a, 130b, 130c, and 230 by the present disclosure, and vice versa.

To detect whether a k×k image patch, i.e., one of patches 354a-354l, contains an anomaly, the patch is masked using mask 352 and the n×n image region surrounding that patch, i.e., a respective one of pixel neighborhoods 356a-356l is used as a frame of reference or context. Referring specifically to patch 354a, for example, the most likely content of patch 354a is predicted using inpainting based on pixel neighborhood 356a, and is then compared to the original content of patch 354a in original input image 330. In some implementations, it may be advantageous or desirable to limit the size of the anomalies that are detected in order to enable use of a substantially smaller inpainting NN architecture than is typically utilized in image inpainting. In one implementation, for example, the anomalies detected using inpainting NN 140/240 may be limited to 3×3 pixel size anomalies, or smaller.

Referring to FIGS. 2 and 3, in some implementations, inpainting NN 240 may have a UNet like architecture, as known in the art, which, according to the present novel and inventive implementation includes partial convolutional layers 242a-242f. Assuming a 3×3 patch size for patches 354a-354l, the forward path and detail layer information are described in FIG. 2. For patches 354a-354l, each patch is masked using a simple multiplication. The corrupted input image and mask 352 are then provided as the input to encoder stage 132. In one implementation, a stride size of 2 may be used in the first three partial convolutional layers 242a, 242b, and 242c. After each of partial convolutional encoder layers 242a, 242b, and 242c, resulting features go through a respective one of batch normalization and ReLU activation layers 244a, 244b, and 244c. That is to say, features go through partial convolutional encoder layer 242a then batch normalization and ReLU activation layer 244a, partial convolutional encoder layer 242b then batch normalization and ReLU activation layer 244b, and partial convolutional encoder layer 242c then batch normalization and ReLU activation layer 244c. The updated mask 352 may be directly sent into the next partial convolutional layer without any activation. The invalid region of the mask shrinks from 3×3 to 1×1 after one partial convolution, and is completely filled after the second partial convolution.

In decoder stage 134, feature maps may be up-sampled by up-sampling layers 246c-246e using bilinear interpolation. Skip connection may be used to concatenate feature maps extracted in encoder stage 132, for better inpainting results. Using the present inpainting solution for anomaly detection, the content of each of patches 354a-354l can be predicted given its respective pixel neighborhood in input image 330.

It is noted that anomalies can appear anywhere in input image 330 and the positions of those anomalies are not known in advance. As a result, the inpainting based prediction described above must be done for entire input image 330. A native application of inpainting NN 240 would require sequential processing of each image patch across the entirety of input image 330 to obtain a full image prediction. To improve upon this strategy, the fact that each patch may be predicted, each patch may be inpainted based on its local pixel neighborhood. For example, patch 354a may be inpainted based solely on pixel neighborhood 356a, patch 354b may be inpainted based solely on pixel neighborhood 356b, patch 354c may be inpainted based solely on pixel neighborhood 356c, and so forth.

As a result it is possible to inpaint patches 354a-354l substantially concurrently. The only constraint is to ensure that no region undergoing inpainting is part of another region's pixel neighborhood. Where patch size is 3×3, and the dimensions of each of pixel neighborhoods 356a-356l is 17×17, for example, the minimal distance is half the pixel neighborhood size (in this example (17−1)/2=8). For simpler alignment, the distance may be the next smallest multiple of cutout size, which would be 9 pixels in the present example. To predict full input image 330, mask 352 is shifted each iteration, making it possible to predict input image 330 with relatively few passes of inpainting NN 240, such as fewer than 20 passes for example, in marked contrast to the several thousand passes required in a sequential patch-wise inpainting process.

Using the same procedure, a different masking pattern can be derived if different sizes and scales are used for anomaly detection. This makes it possible to deal with different anomaly sizes. It is noted that during training of inpainting NN 240, the same pattern masks to be utilized in anomaly detection are used to produce a full patch prediction. Various loss functions can be used for training. For example, in one implementation it may be advantageous or desirable to train inpainting NN 240 using an $l_1$ loss.

Figure 4:
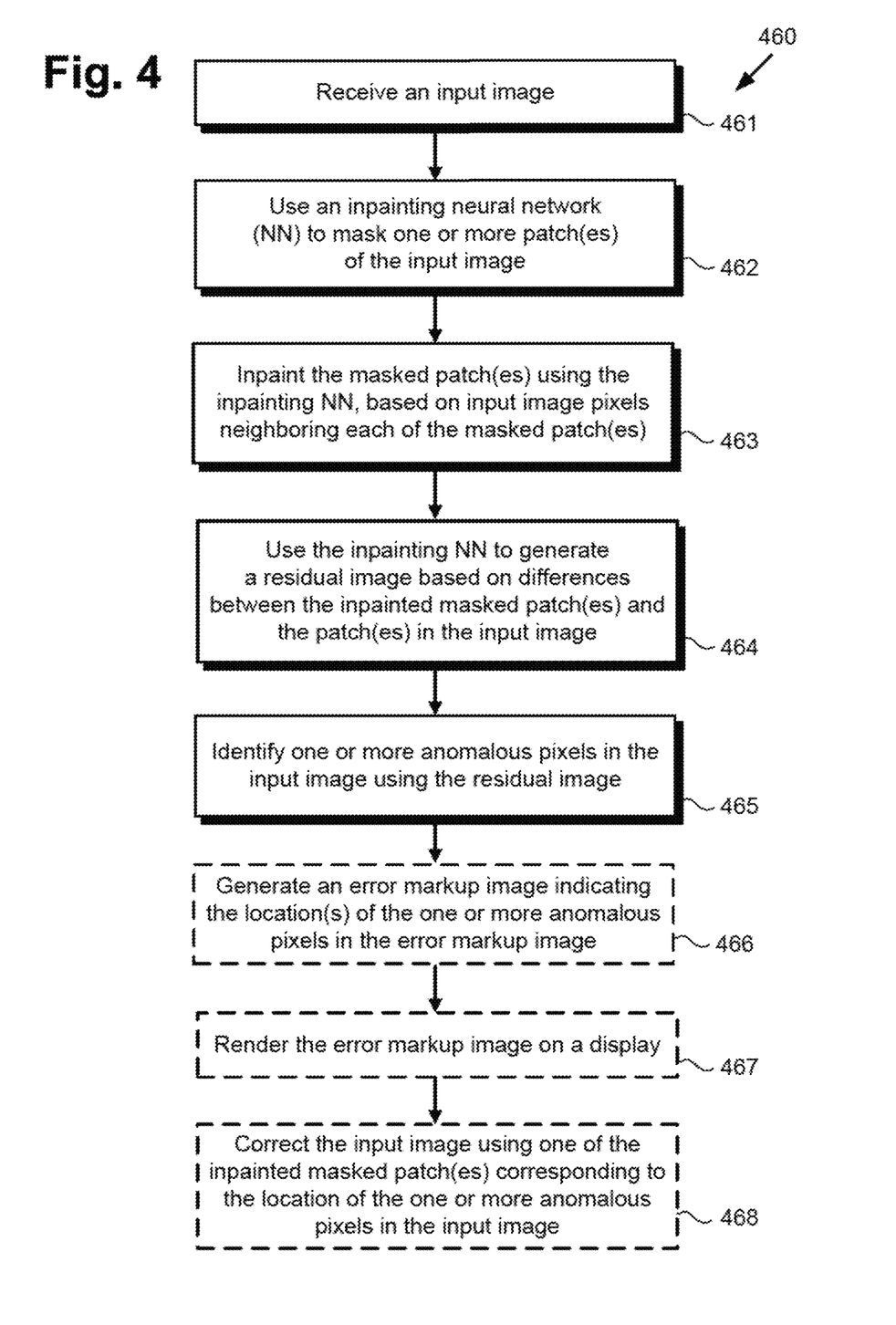
FIG. 4 shows a flowchart presenting an exemplary method for performing automated pixel error detection using an inpainting neural network, according to one implementation.

The functionality of software code 110 including inpainting NN 140/240 will be further described by reference to FIG. 4 in combination with FIGS. 1, 2, and 3, FIG. 4 shows flowchart 460 presenting an exemplary method for performing automated pixel error detection using an inpainting neural network, according to one implementation. With respect to the method outlined in FIG. 4, it is noted that certain details and features have been left out of flowchart 460 in order not to obscure the discussion of the inventive features in the present application.

Referring now to FIG. 4 in combination with FIG. 1, flowchart 460 begins with receiving an input image (action 461). By way of example, user 124 may utilize user system 120 to interact with automated pixel error detection system 100 in order to generate error markup image 138 corresponding to one of input images 130a, 130b, or 130c, each of which may be a digital photograph or one or more video frames, for instance. As shown by FIG. 1, in one implementation, user 124 may transmit the input image from user system 120 to automated pixel error detection system 100 via communication network 108 and network communication links 128. Alternatively, the input image may be received from a third party source, or may be stored in system memory 106. Input image 130*a*, 130*b*, or 130*c* may be received by software code 110, executed by hardware processor 104.

Referring to FIG. 4 in combination with FIGS. 1, 2, and 3, flowchart 460 continues with using inpainting NN 140/240 to mask one or more of patches 354*a*-354*l* of input image 330 (action 462). Action 462 may be performed as described above by software code 110, executed by hardware processor 104, and using mask multiplication layer 250 of inpainting NN 140/240 and mask 352.

Flowchart 460 continues with inpainting the one or more of patches 354*a*-354*l* masked in action 462, using inpainting NN 140/240, based on input image pixels neighboring each of the one or more patches 354*a*-354*l* (action 463). As shown by FIG. 3, according to some implementations, patch 354*a* may be inpainted based on pixel neighborhood 356*a* surrounding patch 354*a*, patch 354*b* may be inpainted based on pixel neighborhood 356*b* surrounding patch 354*b*, patch 354*c* may be inpainted based on pixel neighborhood 356*c* surrounding patch 354*c*, and so forth for each of patches 354*a*-354*l* masked in action 462. Inpainting of patches 354*a*-354*l* based on respective pixel neighborhoods 356*a*-356*l* and using inpainting NN 140/240 may be performed by software code 110, executed by hardware processor 104. Moreover, and as noted above, inpainting NN 140/240 may be configured to inpaint patches 354*a*-354*l* concurrently.

It is noted that although flowchart 460 is directed to an automated method for performing pixel error detection, in some implementations it may be advantageous or desirable to enable a system user to select one or more patches of an input image for analysis. For example, in some use cases regions at the edges of an input image may be considered less (or more) important than regions closer to the center of the input image. In implementations in which a system user selects one or more patches of an input image for pixel error detection analysis, that selection may be made by customizing the size or geometry of the mask used, or by manually selecting one or more patches of interest.

Referring to FIGS. 2, 3, and 4 in combination, flowchart 460 continues with using inpainting NN 240 to generate residual image 236 based on differences between the inpainted one or more masked patches resulting from action 463 and the one or more patches 354*a*-354*l* in original input image 230/330 (action 464). Pixels in residual image 236 may each have an intensity corresponding to the absolute value resulting from subtraction of the inpainted one or more masked patches predicted in action 463 from the one or more patches 354*a*-354*l* in original input image 230/330. Thus, where pixels in an inpainted masked patch match corresponding pixels in original input image 230/330, corresponding pixels in residual image 236 can be expected to appear dark, while pixels in residual image 236 where pixels in inpainted masked patches fail to match pixels in original input image 230/330 may have a brightness proportional to the mismatch.

Figure 5:
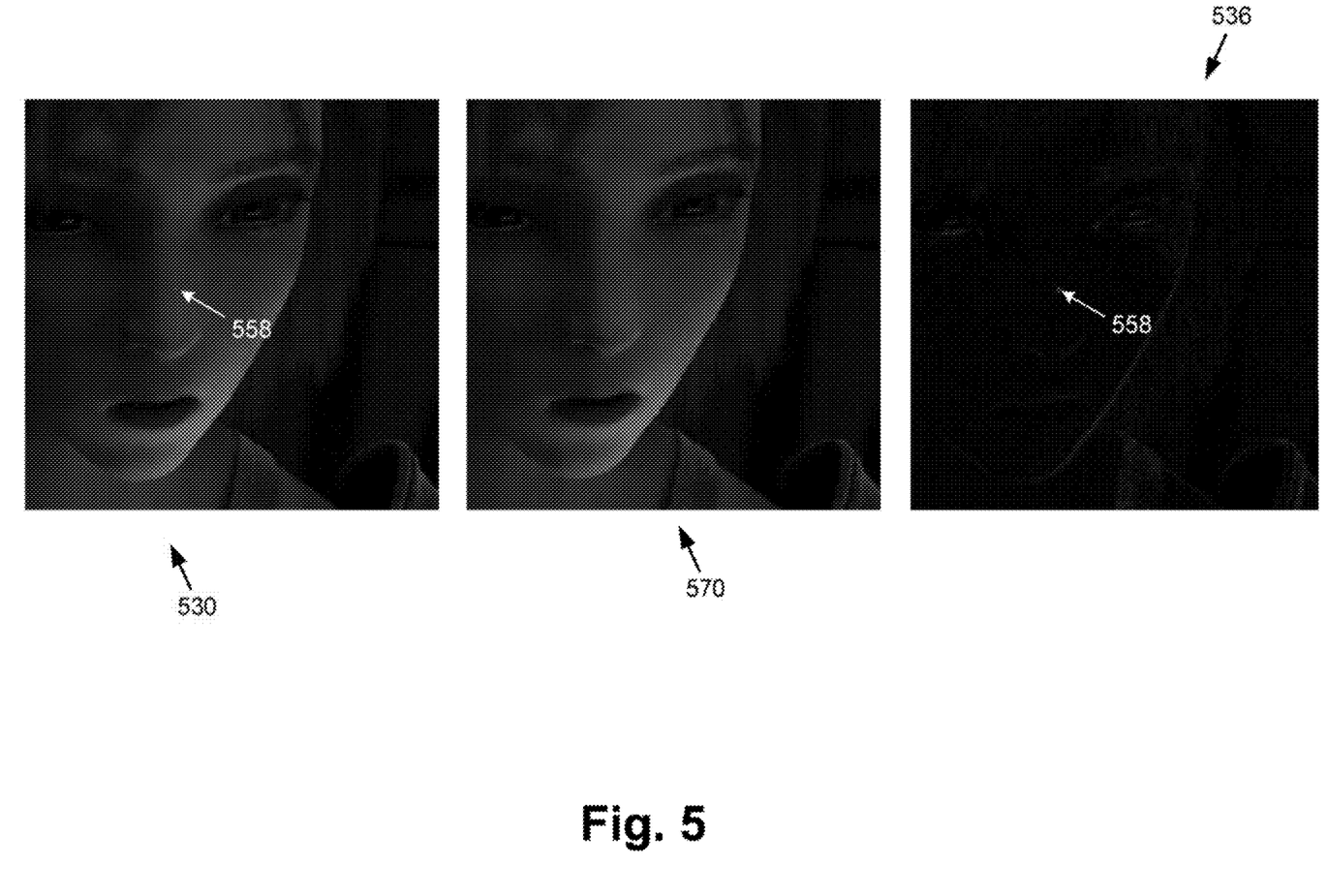
FIG. 5 shows an exemplary input image, its corresponding inpainted image, and a residual image based on differences between the inpainted image and the input image, according to one implementation.

Referring to FIG. 5, FIG. 5 shows exemplary input image 530, its corresponding inpainted image 570, and residual image 536 generated based on differences between inpainted image 570 and input image 530, according to one implementation. Also shown in FIG. 5 is pixel anomaly 558 in input image 530. Input image 530 corresponds in general to any of input images 130*a*, 130*b*, and 130*c*, in FIG. 1, as well as to input image 230/330 in FIG. 2 and FIG. 3. Consequently, input image 530 may share any of the features attributed to input images 130*a*, 130*b*, 130*c*, 230, and 330 by the present disclosure, and vice versa. Residual image 536 corresponds in general to residual image 236, in FIG. 2, and those corresponding features may share any of the characteristics attributed to either feature by the present disclosure.

As shown in FIG. 5, pixel anomaly 558 is present in input image 530 but is absent from inpainted image 570. As a result, subtraction of inpainted image 570 from input image 530 leaves pixel anomaly 558 as the brightest region of residual image 536, thereby advantageously facilitating detection of pixel anomaly 558. Generation of residual image 236/536 in Action 464 may be performed by software code 110, executed by hardware processor 104.

Flowchart 460 continues with identifying one or more anomalous pixels in input image 230/330/530 using residual image 236/536 (action 465). As noted above, and as shown by FIG. 5, anomalous pixels in input image 230/330/530 will typically appear as bright pixels in residual image 236/536. Identification of those bright pixels as one or more anomalous pixels may be performed by software code 110, executed by hardware processor 104. Action 465 may include detecting one or more anomaly candidates in input image 230/330/530 using residual image 236/536, based, for example, on the brightness of the one or more anomaly candidates, and determining a residual value associated with each of the one or more anomaly candidates, such as a residual value corresponding to its relative brightness. In those implementations, the one or more anomaly candidates may be identified as actually anomalous pixels based on comparing their residual values with a predetermined threshold residual value. For example, where the residual values correspond to brightness, the brightness of each anomaly candidate may be compared to a predetermined brightness threshold, mid only those anomaly candidates meeting or exceeding the brightness threshold are identified as anomalous in action 465.

In some implementations, flowchart 460 can conclude with action 465. However, it is noted that several image features, such as edges and reflections for example, can result in high values in the residual image after inpainting. To identify the true anomalies, one or more filtering criteria may be applied in addition to, or in lieu of the predetermined threshold residual value discussed above. For example, and referring to FIG. 1, in some implementations, input image 130*b* being assessed may be one of multiple video frames received by automated pixel error detection system 100, including one or more previous frames 130*a* and/or one or more next frames 130*c*.

In those implementations, hardware processor 104 may execute software code 110 to detect one or more anomaly candidates in video frame 130*b* using its corresponding residual image, perform a comparison of the locations of the one or more anomaly candidates in video frame 130*b* with corresponding locations in at least one previous frame 130*a* or at least one next frame 130*c* of the video frames, and identify the one or more anomaly candidates as actually anomalous based on the comparisons.

As a simplistic example of the use of sequential frames to identify anomalous pixels: where an anomaly candidate appears in a sequence of residual frames, that anomaly candidate might be disregarded. By contrast, where an anomaly candidate appears in a single residual frame of a sequence, the anomaly candidate might be identified as one or more anomalous pixels. However, it is noted that there can be pixel anomalies that persist for more than one frame. As a result, in some implementations it may be advantageous or desirable to evaluate anomaly candidates based on a combination of their temporal and spatial characteristics, rather than relying on their presence in, or absence from, multiple frames.

Where multiple anomaly candidates are present in the input image, those anomaly candidates may be filtered by identifying clusters of anomaly candidates and filtering the clusters based on their geometries. For instance, after clustering anomaly candidates, any cluster of anomaly candidates having a large size or non-centralized distribution can be disregarded based on those geometries. Thus, in some implementations, anomaly candidates that do not belong to a cluster, or that occupy small or compact clusters may be identified as anomalous pixels. It is noted that the identification of clusters may be performed using any suitable clustering algorithm. By way of example, in one implementation, clustering of anomaly candidates may be performed using the density-based spatial clustering of applications with noise (DBSCAN) algorithm for clustering.

Alternatively, or in addition, anomaly candidates may be filtered based on the geometry of a cluster identified from a mapping of their feature vectors over a sequence of input images. As a specific example, assume that input image 130a corresponds to two sequential video frames previous to input image 130b, and that input image 130c corresponds to two sequential next video frames following input image 130b. Hardware processor 104 may execute software code to generate five residual images from input images 130a, 130b, and 130c in order to benefit from temporal information. Any pixel with a high residual value may be considered an anomaly candidate. Pixel location (in space and time) together with color information from original input images 130a, 130b, and 130c may be used as feature vectors. After clustering of the feature vectors, any cluster with a large size or non-centralized shape can be disregarded based on its geometry. Thus, anomaly candidates represented by feature vectors occupying small or compact clusters may be identified as anomalous pixels. It is noted that in various implementations, the feature vector mapping may be performed in two-dimensions (2D) or in three-dimensions (3D).

It is further noted that the criteria used to determine what constitutes a "high residual value," a "large" or "non-centralized" cluster shape or distribution, and a "small" or "compact" cluster may be predetermined and may vary depending on the particular application. As a specific but non-limiting example, in one implementation, a residual value of 40 may be used as a threshold to consider for clusters; if all are under this value, skip to the next frame batch. Such a threshold may also be used as a post-clustering check for normalizing outlier values. By contrast a residual value of 15 may be a high enough threshold to determine which pixels should be considered anomaly candidates; above this value and the pixel or pixels is/are included in a potential cluster of pixel anomalies. Additional criteria may include capping the number of pixels to consider for a cluster to some predetermined value, such as a 300, for example, as well as setting a limit on the maximum diameter, and/or the height-to-width ratio for clusters.

Figure 6A:
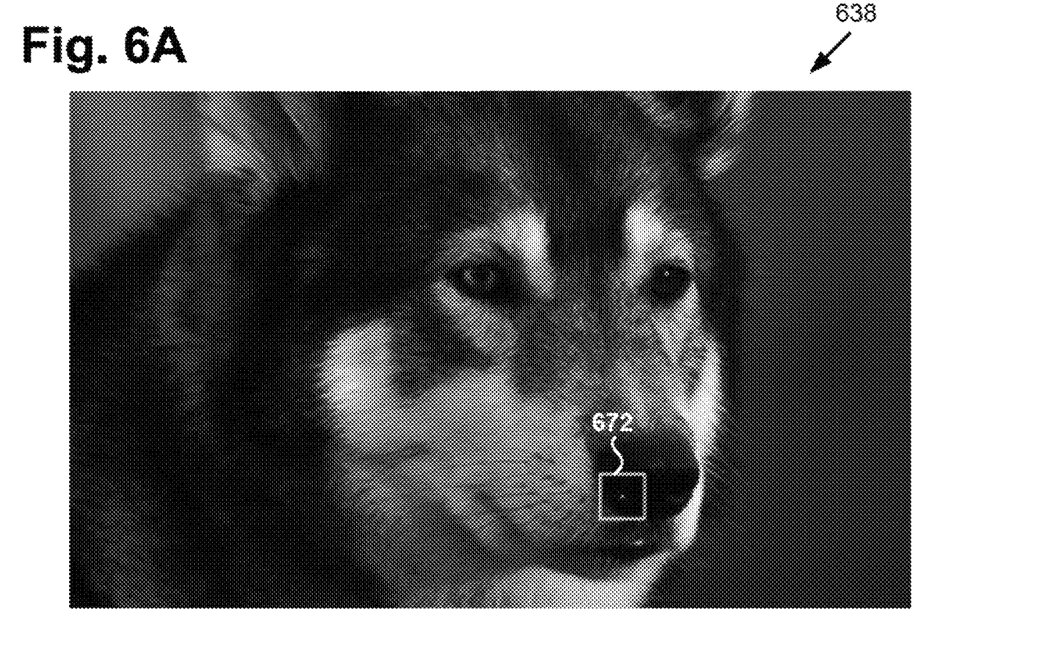
FIG. 6A shows an exemplary error markup image indicating a location of an anomalous pixel in the error markup image, according to one implementation.
Figure 6B:
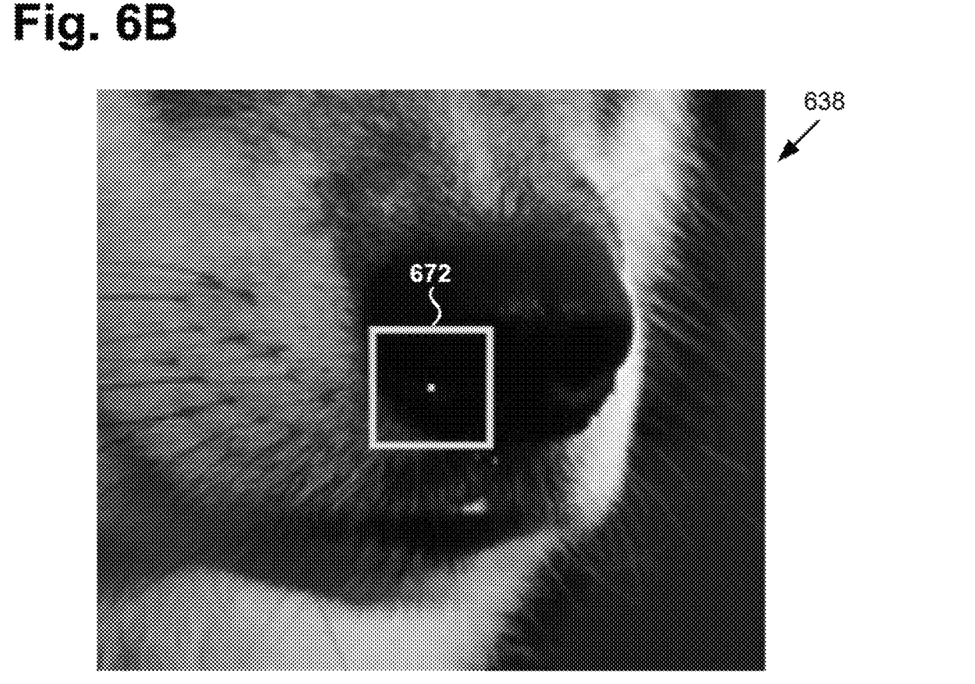
FIG. 6B shows a close-up view of the anomalous pixel in the error markup image of FIG. 6A.

As noted above, in some implementations, flowchart 460 can conclude with action 465. However, in some implementations, flowchart 460 may continue with optionally generating error markup image 138 indicating the location or locations of the one or more anomalous pixels identified in action 465, within the error markup image (action 466). FIG. 6A shows exemplary error markup image 638 indicating location 672 of an anomalous pixel in error markup image 638, according to one implementation, while FIG. 6B shows a close-up view of the anomalous pixel in error markup image 638. Error markup image 638 corresponds in general to error markup image 138, in FIG. 1, and those corresponding features may share any of the characteristics attributed to either feature by the present disclosure. Error markup image 138/638 corresponds to the input image received in action 461, having location 672 of any anomalous pixels identified in action 465. Error markup image 138/638 may be generated by software code 110, executed by hardware processor 104, and, referring to FIG. 2, using input image 230 and residual image 236.

In some implementations, the method outlined by flowchart 460 may continue with optionally rendering error markup image 138/638 on a display, such as display 122 of user system 120 (action 467). As also noted above, display 122 may be implemented as an LCD, LED display, or an OLED display, for example. Moreover, in some implementations display 122 may take the form of a high-definition (HD) display, or an Ultra HD display such as a 4K or 8K resolution display.

In some implementations, user system 120 including display 122 may be integrated with automated pixel error detection system 100 such that display 122 may be controlled by hardware processor 104 of computing platform 102. In other implementations, as noted above, software code 110 may be stored on a computer-readable non-transitory medium, and may be accessible to the hardware processing resources of user system 120. In those implementations, the rendering of error markup image 138/638 on display 122 may be performed by software code 110, executed either by hardware processor 104 of computing platform 102, or by a hardware processor of user system 120.

In some implementations, the method outlined by flowchart 460 may continue and conclude with optionally correcting input image 230/330/530 using a respective one of inpainted masked patches 354a-354l corresponding to the location of the one or more anomalous pixels in input image 230/330/530 that were identified in action 465 (action 468). It is noted that the inpainting performed in action 463 predicts how input image 230/330/530 should appear in a certain region given a suitable context, i.e., pixel neighborhoods 356a-356l. By comparing input image 230/330/530 with the prediction represented by inpainted image 570, residual image 236/536 is obtained that indicates where things appear differently than expected. Therefore, residual image 236/536 is a good basis for further processing to detect pixel anomalies. In order to correct an identified pixel anomaly, it may be advantageous or desirable to rely on the results of the initial inpainting network for correction because its prediction models how a proper image would look given suitable context.

Correction of input image 230/330/530 in action 468 may be performed by software code 110, executed by hardware processor 104. In some implementations, correction of input image 230/330/530 in action 468 may be performed as an automated process using one of inpainted masked patches 354a-354l. However, in other implementations, action 468 may be performed in response to a correction input provided to automated pixel error detection system 100 by user 124 via user system 120, communication network 108, and network communication links 128.

It is noted that the order in which action 466, 467, and 468 are shown in FIG. 4 is merely exemplary. It is emphasized that those actions are optional. Thus, in some implementations, flowchart 460 may conclude with action 465. In other implementations, action 468 may precede one or both of actions 466 and 467. In yet other implementations, action 468 may follow directly from action 465 with actions 466 and 467 omitted entirely.

Thus, the present application discloses systems and methods for performing automated pixel error detection using an inpainting NN that overcome the drawbacks and deficiencies in the conventional art. The automated pixel error detection solution disclosed in the present application improves on previous attempts to automate pixel error detection by producing a more complex representation of the differences between a predicted image, i.e., an inpainted image, and an original input image.

In addition, in contrast to other attempts to automate pixel error detection, the present solution identifies pixel errors to the pixel level, instead of the patch coordinate level, and successfully detects errors even where they persist beyond a single image, such as across multiple frames of video. Moreover, the present solution enables use of a longer sequence of images preceding and following an image undergoing pixel error detection, uses original color information from those preceding and following images, and enables the optional incorporation of optical flow predictions. As a result, the present solution advantageously yields better results than other attempts to automate pixel error detection, with lower false positive rates and very high recall, and in fact enables the detection of pixel errors that human inspectors and previous automated pixel error detection solutions had failed to identify.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An automated pixel error detection system comprising:
a hardware processor; and
a system memory storing a software code;
the hardware processor configured to execute the software code to:
  receive an input image;
  mask, using an inpainting neural network (NN), one or more patches of the input image;
  inpaint, using the inpainting NN, the one or more masked patches based on a plurality of input image pixels neighboring each of the one or more masked patches;
  generate, using the inpainting NN, a residual image based on differences between the inpainted one or more masked patches and the one or more patches in the input image; and
  identify at least one anomalous pixel in the input image using the residual image.

2. The automated pixel error detection system of claim 1, wherein the one or more masked patches comprise a plurality of masked patches, and wherein the inpainting NN is configured to inpaint the plurality of masked patches concurrently.

3. The automated pixel error detection system of claim 1, wherein the plurality of input image pixels neighboring each of the one or more masked patches surrounds each of the one or more masked patches.

4. The automated pixel error detection system of claim 1, wherein the hardware processor is configured to further execute the software code to:
  detect at least one anomaly candidate in the input image using the residual image,
  determine a residual value associated with the at least one anomaly candidate; and
  identify the at least one anomaly candidate as the at least one anomalous pixel based on comparing the residual value with a predetermined threshold residual value.

5. The automated pixel error detection system of claim 1, wherein the input image is one of a plurality of video frames received by the automated pixel error detection system, and wherein the hardware processor is configured to further execute the software code to:
  detect at least one anomaly candidate in the input image using the residual image,
  perform a comparison of a location of the at least one anomaly candidate in the video frame including the input image with corresponding locations in at least one of a previous frame or a next frame of the plurality of video frames; and
  identify the at least one anomaly candidate as the at least one anomalous pixel based on the comparison.

6. The automated pixel error detection system of claim 1, wherein the hardware processor is configured to further execute the software code to:
  detect a plurality of anomaly candidates in the input image using the residual image, cluster the plurality of anomaly candidates based on a location of each of the plurality of anomaly candidates in the input image, resulting in at least one anomaly candidate cluster; and
  identify the at least one anomalous pixel based on a geometry of the at least one anomaly candidate cluster.

7. The automated pixel error detection system of claim 1, wherein the hardware processor is configured to further execute the software code to:
  detect a first plurality of anomaly candidates in the input image using the residual image,
  determine a residual value associated with each of the first plurality of anomaly candidates;
  disregard any anomaly candidates associated with a residual value less than a predetermined threshold residual value, resulting in a second plurality of anomaly candidates;
  cluster the second plurality of anomaly candidates based on a location of each of the second plurality of anomaly candidates in the input image, resulting in at least one anomaly candidate cluster; and
  identify the at least one anomalous pixel based on a geometry of the at least one anomaly candidate cluster.

8. The automated pixel error detection system of claim 1, wherein the inpainting NN comprises a plurality of partial convolutional encoder layers and a plurality of partial convolutional decoder layers.

9. The automated pixel error detection system of claim 1, wherein the hardware processor is configured to further execute the software code to generate an error markup image corresponding to the input image, the error markup image indicating a location of the at least one anomalous pixel in the error markup image.

10. The automated pixel error detection system of claim 1, wherein the hardware processor is configured to further execute the software code to correct the input image using a respective one of the inpainted one or more masked patches corresponding to a location of the at least one anomalous pixel in the input image.

11. A method for use by an automated pixel error detection system including a hardware processor and a system memory storing a software code, the method comprising:
receiving, by the software code executed by the hardware processor, an input image;
masking, by the software code executed by the hardware processor and using an inpainting neural network (NN), one or more patches of the input image;
inpainting, by the software code executed by the hardware processor and using the inpainting NN, the one or more masked patches based on a plurality of input image pixels neighboring each of the one or more masked patches;
generating, by the software code executed by the hardware processor and using the inpainting NN, a residual image based on differences between the inpainted one or more masked patches and the one or more patches in the input image; and
identifying, by the software code executed by the hardware processor, at least one anomalous pixel in the input image using the residual image.

12. The method of claim 11, wherein the one or more masked patches comprise a plurality of masked patches, and wherein the inpainting NN is configured to inpaint the plurality of masked patches concurrently.

13. The method of claim 11, wherein the plurality of input image pixels neighboring each of the one or more masked patches surrounds each of the one or more masked patches.

14. The method of claim 11, further comprising:
detecting, by the software code executed by the hardware processor, at least one anomaly candidate in the input image using the residual image,
determining, by the software code executed by the hardware processor, a residual value associated with the at least one anomaly candidate; and
identifying the at least one anomaly candidate as the at least one anomalous pixel based on comparing the residual value with a predetermined threshold residual value.

15. The method of claim 11, wherein the input image is one of a plurality of video frames received by the automated pixel error detection system, the method further comprising:
detecting, by the software code executed by the hardware processor, at least one anomaly candidate in the input image using the residual image,
performing a comparison, by the software code executed by the hardware processor, of a location of the at least one anomaly candidate in the video frame including the input image with corresponding locations in at least one of a previous frame or a next frame of the plurality of video frames; and
identifying the at least one anomaly candidate as the at least one anomalous pixel based on the comparison.

16. The method of claim 11, the method further comprising:
detecting, by the software code executed by the hardware processor, a plurality of anomaly candidates in the input image using the residual image,
clustering, by the software code executed by the hardware processor, the plurality of anomaly candidates based on a location of each of the plurality of anomaly candidates in the input image, resulting in at least one anomaly candidate cluster; and
identifying the at least one anomalous pixel based on a geometry of the at least one anomaly candidate cluster.

17. The method of claim 11, further comprising:
detecting, by the software code executed by the hardware processor, a first plurality of anomaly candidates in the input image using the residual image,
determining, by the software code executed by the hardware processor, a residual value associated with each of the first plurality of anomaly candidates;
disregarding, by the software code executed by the hardware processor, any anomaly candidates associated with a residual value less than a predetermined threshold residual value, resulting in a second plurality of anomaly candidates;
clustering, by the software code executed by the hardware processor, the second plurality of anomaly candidates based on a location of each of the second plurality of anomaly candidates in the input image, resulting in at least one anomaly candidate cluster; and
identifying the at least one anomalous pixel based on a geometry of the at least one anomaly candidate cluster.

18. The method of claim 11, wherein the inpainting NN comprises a plurality of partial convolutional encoder layers and a plurality of partial convolutional decoder layers.

19. The method of claim 11, further comprising generating, by the software code executed by the hardware processor, an error markup image corresponding to the input image, the error markup image describing a location of the at least one anomalous pixel in the error markup image.

20. The method of claim 11, further comprising correcting, by the software code executed by the hardware processor, the input image using a respective one of the inpainted one or more masked patches corresponding to a location of the at least one anomalous pixel in the input image.

* * * * *